US007889082B2

(12) United States Patent
Bauchot et al.

(10) Patent No.: US 7,889,082 B2
(45) Date of Patent: Feb. 15, 2011

(54) EXPIRATION MANAGEMENT METHOD AND SYSTEM

(75) Inventors: Frederic Bauchot, Saint-Jeannet (FR); Jean-Yves Clement, Saint-Jeannet (FR); Gerard Marmigere, Drap (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/267,703

(22) Filed: Nov. 10, 2008

(65) Prior Publication Data

US 2010/0109852 A1 May 6, 2010

(30) Foreign Application Priority Data

Nov. 5, 2008 (EP) .................................. 08305777

(51) Int. Cl.
  *G08B 13/14* (2006.01)
(52) U.S. Cl. ................ 340/572.1; 340/572.8; 340/10.1; 340/309.16; 235/385
(58) Field of Classification Search .............. 340/572.1, 340/572.8, 539.1, 10.1, 309.16; 235/381, 235/382, 383, 385
See application file for complete search history.

(56) References Cited

U.S. PATENT DOCUMENTS 6,982,640 B2 * 1/2006 Lindsay et al. .............. 340/540
7,053,773 B2 * 5/2006 McGarry et al. .......... 340/568.1
7,292,146 B1 * 11/2007 Nguyen .................... 340/572.1
7,518,511 B1 * 4/2009 Panja et al. ............... 340/572.1
7,735,732 B2 * 6/2010 Linton et al. ................. 235/385
7,737,855 B2 * 6/2010 Rubinstein ............... 340/572.4
7,784,689 B2 * 8/2010 Linton et al. ................. 235/385
7,791,479 B2 * 9/2010 Dearing et al. ........... 340/572.1
2005/0168325 A1   8/2005 Lievre et al.
2006/0267768 A1  11/2006 Sabeta

FOREIGN PATENT DOCUMENTS

GB        2419868 A       5/2006
WO    WO2006016343 A1    2/2006

* cited by examiner

*Primary Examiner*—Davetta W Goins
(74) *Attorney, Agent, or Firm*—Schmeiser, Olsen & Watts; John Pivnichny

(57) ABSTRACT

An expiration management method and system. The method includes transmitting by an RFID tag reader within an enclosure, a plurality of continuous timing signals. The enclosure comprises a container comprising a product and an RFID tag. The RFID tag comprises data indicating a first state for the RFID tag and a first time period. The RFID tag reader receives the data and generates a first time stamp. The RFID tag reader transmits a first message commanding the RFID tag to enter a second state. The RFID tag reader transmits the first time stamp and generates a second time stamp. The RFID tag reader transmits the second time stamp. The RFID tag reader receives results from a comparing process performed by the RFID tag. The RFID tag reader performs a function indicating the results.

20 Claims, 4 Drawing Sheets

EXPIRATION MANAGEMENT METHOD AND SYSTEM

FIELD OF THE INVENTION

The present invention relates to a method and associated system for managing an expiration of products.

BACKGROUND OF THE INVENTION

Determining if items are valid for usage typically comprises an inefficient process with little flexibility. Accordingly, there exists a need in the art to overcome at least some of the deficiencies and limitations described herein above.

SUMMARY OF THE INVENTION

The present invention provides a method comprising:

transmitting, by an RFID tag reader within an enclosure in response to first opening said enclosure, a plurality of continuous timing signals, wherein said enclosure comprises a container comprising a product, wherein said container is internal to said enclosure, wherein said container comprises an RFID tag mechanically attached to said container, and wherein said RFID tag comprises first data indicating a first state for said RFID tag, wherein said first state indicates that said container is new and has never been opened, and wherein said first data comprises a first time period;

receiving, by said RFID tag reader from said RFID tag, said first data;

generating, by said RFID tag reader in response to said container being opened a first time, a first time stamp;

transmitting, by said RFID tag reader to said RFID tag in response to said container being opened said first time, a first message, wherein said first message commands said RFID tag to enter a second state, wherein said second state indicates that said container has been opened said first time;

transmitting, by said RFID tag reader to said RFID tag in response to said container being opened said first time, said first time stamp, wherein said first time stamp is stored in said RFID tag, wherein said first container has been closed;

generating, by said RFID tag reader in response to said container being opened a second time, a second time stamp, wherein said second time stamp indicates a later time than said first time stamp;

transmitting, by said RFID tag reader to said RFID tag in response to said container being opened said second time, said second time stamp, wherein said RFID tag performs a comparing process comprising comparing said second time stamp to a sum of said first time stamp and said first time period;

receiving, by said RFID tag reader from said RFID tag, results of comparing process; and performing, by said RFID tag reader, a function indicating said results.

The present invention provides an RFID tag reader comprising a processor coupled to a computer-readable memory unit, said RFID tag reader located within an enclosure, said memory unit comprising instructions that when executed by the processor implements an expiration management method, said method comprising:

transmitting, by said RFID tag reader in response to first opening said enclosure, a plurality of continuous timing signals, wherein said enclosure comprises a container comprising a product, wherein said container is internal to said enclosure, wherein said container comprises an RFID tag mechanically attached to said container, and wherein said RFID tag comprises first data indicating a first state for said RFID tag, wherein said first state indicates that said container is new and has never been opened, and wherein said first data comprises a first time period;

receiving, by said RFID tag reader from said RFID tag, said first data;

generating, by said RFID tag reader in response to said container being opened a first time, a first time stamp;

transmitting, by said RFID tag reader to said RFID tag in response to said container being opened said first time, a first message, wherein said first message commands said RFID tag to enter a second state, wherein said second state indicates that said container has been opened said first time;

transmitting, by said RFID tag reader to said RFID tag in response to said container being opened said first time, said first time stamp, wherein said first time stamp is stored in said RFID tag, wherein said first container has been closed;

generating, by said RFID tag reader in response to said container being opened a second time, a second time stamp, wherein said second time stamp indicates a later time than said first time stamp;

transmitting, by said RFID tag reader to said RFID tag in response to said container being opened said second time, said second time stamp, wherein said RFID tag performs a comparing process comprising comparing said second time stamp to a sum of said first time stamp and said first time period;

receiving, by said RFID tag reader from said RFID tag, results of comparing process; and performing, by said RFID tag reader, a function indicating said results.

The present invention advantageously provides a simple method and associated system capable of determining if items are valid for usage.

DETAILED DESCRIPTION OF THE INVENTION

Figure 1:
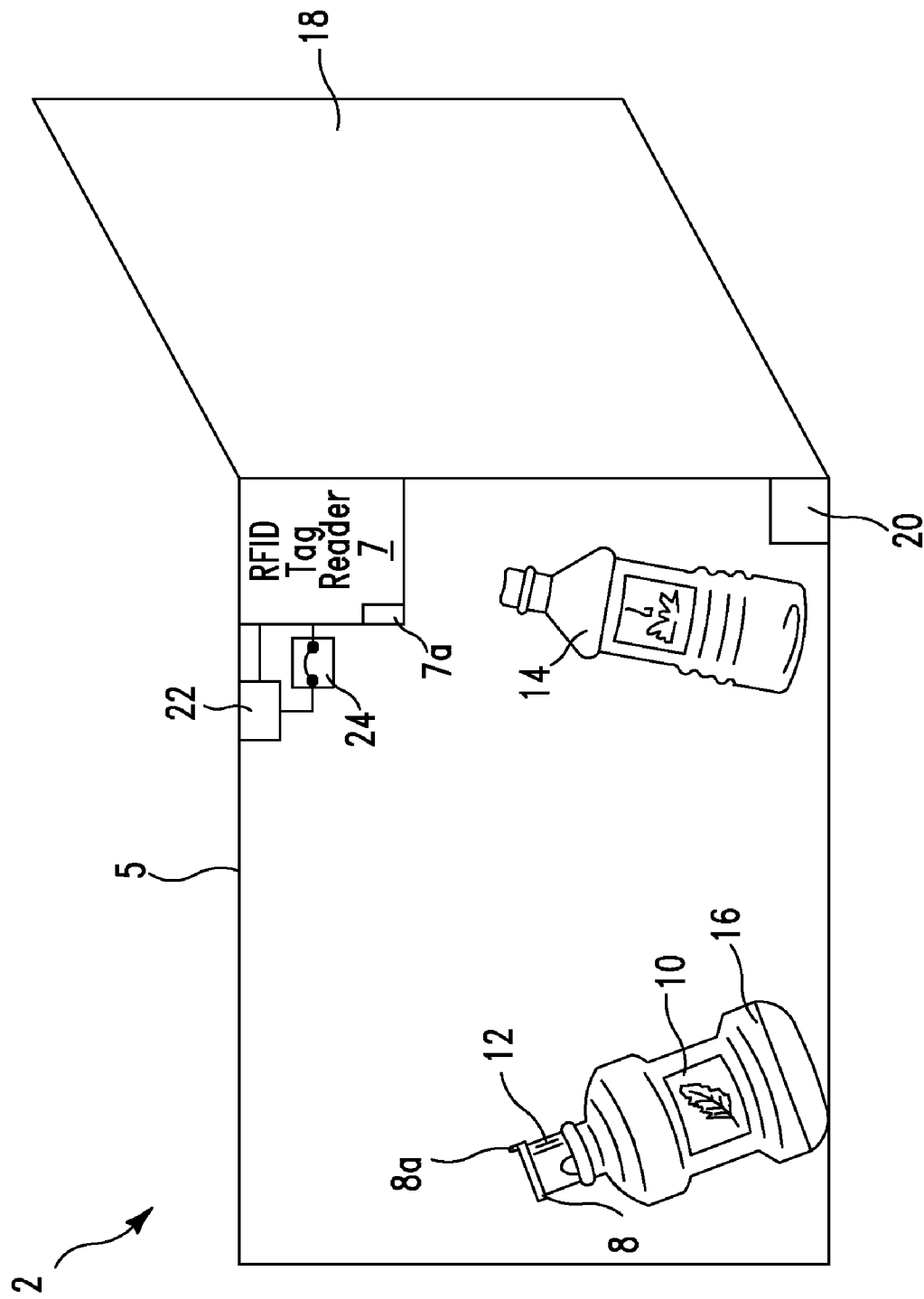
FIG. 1 illustrates a block diagram of a system for managing an expiration of products, in accordance with embodiments of the present invention.

FIG. 1 illustrates a block diagram of a system 2 comprising an enclosure 5, radio frequency identification (RFID) tag reader (or transceiver) 7, an RFID tag 8, a container 10, and a container 14, in accordance with embodiments of the present invention. System 5 is used to manage an expiration of products (e.g., product 16 in container 10). Product 16 may comprise any type of perishable or non-perishable product (e.g., food product, pharmaceutical product, medical product, household product, automotive product, etc). Enclosure 5 may comprise any type of enclosure including, inter alia, a box, a cabinet, a closet, etc. Enclosure 5 comprises a door 18 (i.e., illustrated as open) and an optional electromechanical actuator device 20 (e.g., a solenoid) for closing and locking door 18 if product 16 is determined to be expired. Additionally, an actuator device may be placed on cap 12 so that cap 12 may be locked in place if product 16 is determined to be expired. RFID tag reader (or transceiver) 7, RFID tag 8, container 10, and container 14 are located within enclosure 5. RFID tag 8 is a wireless device for receiving and responding (e.g., responding with an ID code, data, etc) to RF queries. RFID tag 8 may comprise a computer readable memory unit, a central processing unit (CPU) and logic for executing functions. RFID tag may comprise a passive RFID tag or an active RFID tag. A passive RFID tag is defined herein as an RFID tag that receives power (i.e., for powering circuits internal to the RFID tag) from an RFID tag reader (e.g., RFID tag reader 7). An active RFID tag is defined herein as an RFID tag that comprises an internal (i.e., internal to the RFID tag) power source (e.g., a battery, a capacitor, etc) for powering circuits internal to the RFID tag. RFID tag 8 may be mechanically attached to cap 8 or container 10. Alternatively, RFID tag 8 may be located anywhere in enclosure 5. RFID tag reader 7 may comprise a computer readable memory unit, a central processing unit (CPU) and logic for executing functions. RFID tag reader 7 may be connected to an optional power source 22 via a switch 24. RFID tag reader 7 may be enabled by opening door 18 (i.e., thereby closing switch 24 and enabling a voltage from power source 22 to reach RFID tag reader 7) and disabled by closing door 18 (i.e., thereby opening switch 24 and disabling a voltage from power source 22 from reaching RFID tag reader 7). RFID tag reader 7 comprises an indicator 7a for indicating a state (e.g., expired, 50% shelf life, etc) of a product 16 in container 10 or a state of cap or stopper 12 (e.g., never been opened, time last opened, etc) on container 10. RFID tag reader comprises an indicator 8a for indicating a state (e.g., expired, 50% shelf life, etc) of product 16 in container 10 or a state of cap or stopper 12 (e.g., never been opened, time last opened, etc) on container 10. Indicators 7a and 8a may comprise any type of indicator including, inter alia, an audible indicator (e.g., an amplified speaker producing different audible sounds), a visual indicator (e.g., a light or LED, a display, etc).

System 2 of FIG. 1 is used to perform the following functions with respect to managing expiration (e.g., product 16 has past an expiration date) of product 16 in container 10:

1. RFID tag reader 7 provides or transmits continuous clock (or timing) signals when door 18 is opened. The timing signals are disabled when door 18 is closed. Energy for the continuous clock (or timing) signals may be provided by mechanical strength due to door 18 opening or by a power source (e.g., optional power source 22) such as, inter alia, battery, a power supply, etc).

2. Product 16 is stored in enclosure 5 within a container 10. Container 10 is closed or locked by cap 12 equipped with RFID tag 8.

3. RFID tag 8 receives a signal from RFID tag reader 7.

4. RFID tag 8 stores a clock signal (i.e., from the continuous clock signals) at an initial opening of door 18. Additionally, RFID tag 8 stores a clock signal (i.e., from the continuous clock signals) each time door 18 is opened.

5. RFID tag 8 calculates an expiration time or date for product 16 via a time limit constant stored in RFID tag 8.

6. A state for product 16 is stored in RFID tag 8.

7. Indicator 7a and/or 8a may be enabled thereby indicating the current state for product 16.

Figure 2:
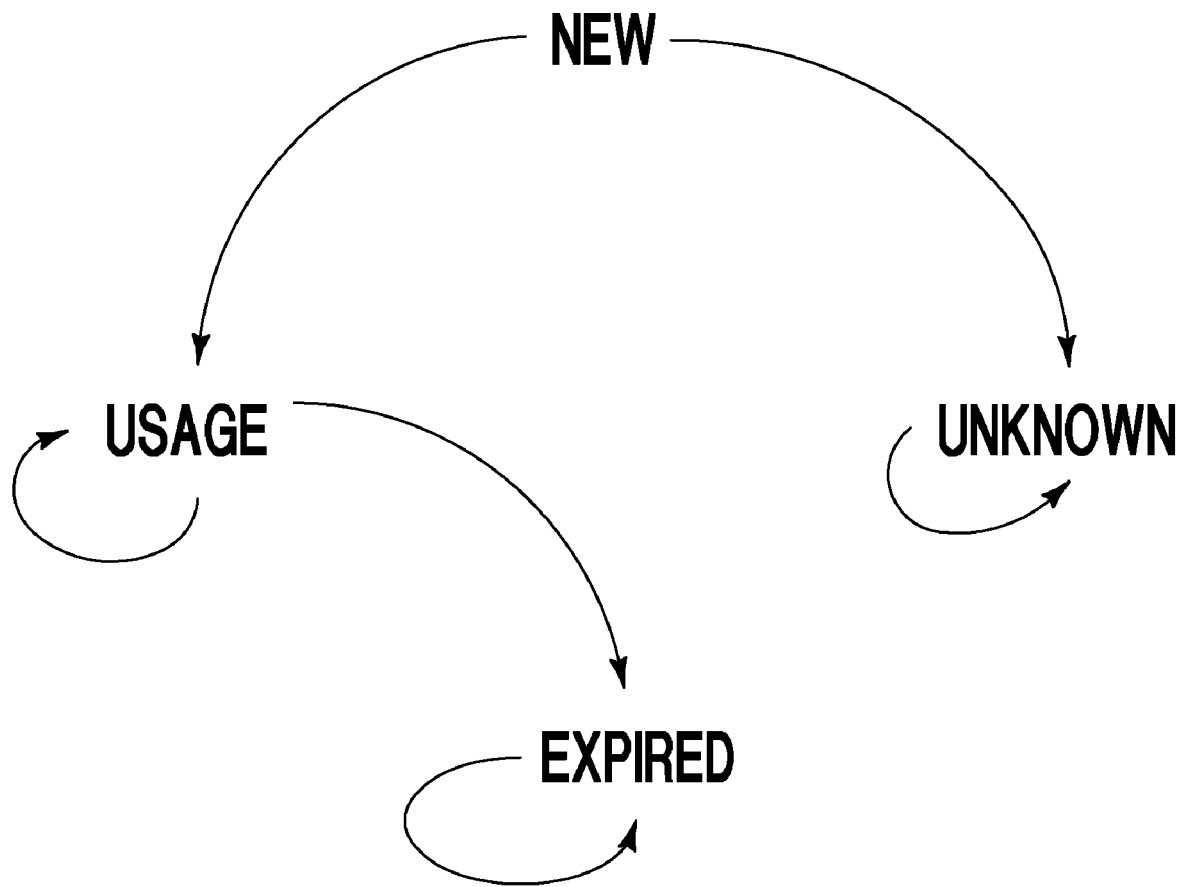
FIG. 2 illustrates a state machine describing an algorithm used by the system of FIG. 1 for calculating a state of a product, in accordance with embodiments of the present invention.

FIG. 2 illustrates a state machine 200 describing an algorithm used by system 2 of FIG. 1 for calculating a state of a product, in accordance with embodiments of the present invention. The following steps illustrate the process described by state machine 200:

1. When a door (e.g., door 18 in FIG. 1) for an enclosure (e.g., enclosure 5 in FIG. 1 is closed, an RFID tag reader (e.g., RFID tag reader 7 in FIG. 1) is disabled (i.e., not powered). A state of a product (e.g., product 16 in FIG. 1) remains unchanged. The unchanged state is stored in an RFID tag (e.g., RFID tag 8 in FIG. 1).

2. When the door is opened, the RFID tag reader is enabled (i.e., powered) and continuously transmits timing beacons (e.g., signals).

3. At the end of a manufacturing process, (i.e., when a container (e.g., container 10 in FIG. 1) receives the product and is sealed by a cap (e.g., cap 12 in FIG. 1), the RFID tag receives a signal directing the RFID tag to enter a state of NEW into a memory structure of the RFID tag.

4. When the cap is removed a first time (i.e., when the RFID Tag memory structure comprises the state NEW):
   A. If no signal is detected from the RFID tag reader, the RFID tag enters a state of UNKNOWN in its memory structure as soon as the cap is placed on the container.
   B. If a signal is detected from the RFID tag reader, a time stamp is written into the memory structure (i.e., of the RFID tag) as T0 and the RFID tag enters a state of USAGE into its memory structure.

5. When the cap is opened again while the memory structure of the RFID Tag comprises the state USAGE:
   A. If no signal is detected from the RFID tag reader, nothing happens and the state in the memory structure of the RFID tag remains unchanged.
   B. If a signal is detected from the RFID tag reader, the RFID tag receives a time stamp t and compares it with a sum of T0 and an initial time TL (i.e., T0+TL).
      a. If the time stamp t is less than the sum, the RFID the tag answers with a positive response which is received by the RFID tag reader. In response, the RFID tag reader performs a function indicating this result that the product is not expired (e.g. the function may be to enable an indicator (e.g., indicator 7a or 8a of FIG. 1) such as a green light, a digital display, an amplified speaker, etc).
      b. If the time stamp t is greater than the sum, the RFID the tag answers with a negative response which is received by the RFID tag reader. In response, the RFID tag reader performs a function indicating this result that the product is expired (e.g. the function may be to enable an indicator (e.g., indicator 7a or 8a of FIG. 1) such as a red light, a digital display, an amplified speaker, etc) and the RFID tag enters a state of EXPIRED in its memory structure.

6. When the cap is opened while the RFID tag comprises the state of UNKNOWN in its memory structure:
   A. If no signal is detected from the RFID tag reader or a signal is detected from the RFID tag reader, the state in the memory structure remains unchanged.

7. When the cap is opened while the RFID tag comprises the state of EXPIRED in its memory structure:
   A. If no signal is detected from the RFID tag reader, the state in the memory structure remains unchanged.

B. If a signal is detected from the RFID tag reader, the RFID tag answers with a negative response which is received by RFID tag reader. The RFID tag reader performs a function indicating this result that the product is expired (e.g. the function may be to enable an indicator (e.g., indicator 7a or 8a of FIG. 1) such as a red light, a digital display, an amplified speaker, etc)

Figure 3:
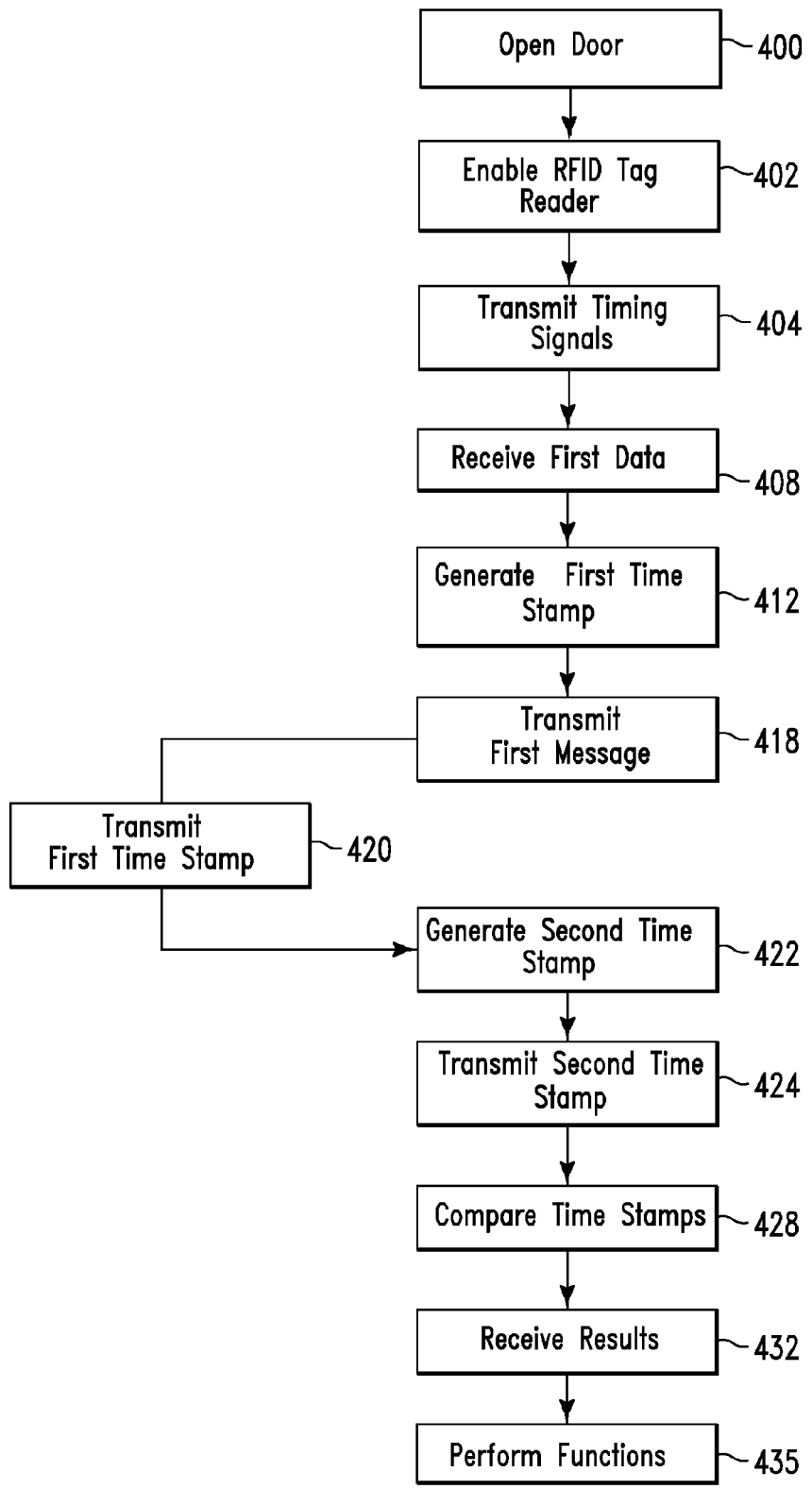
FIG. 3 illustrates a flowchart describing an algorithm used by the system of FIG. 1 for managing an expiration of products, in accordance with embodiments of the present invention.

FIG. 3 illustrates a flowchart describing an algorithm used by system 2 of FIG. 1 for managing an expiration of products, in accordance with embodiments of the present invention. In step 400, a door (e.g., door 18 of FIG. 1) for an enclosure (e.g., enclosure 5 of FIG. 1) is opened. In step 402, an RFID tag reader (e.g., RFID tag reader 7 in FIG. 1) is enabled in response to the door being opened. The RFID tag reader may be enabled by connecting a voltage source to the RFID tag reader. For example, engaging the switch 24 and enabling the power source 22 to provide a voltage to the RFID tag reader (i.e., as illustrated in FIG. 1). In step 404, the RFID tag reader transmits a plurality of continuous timing signals in response to being enabled in step 402. In step 408, the RFID tag reader receives from an RFID tag (e.g., RFID tag 8 in FIG. 1) first data. The first data indicates a first state for the RFID tag. The first state indicates that a container associated with the RFID tag (e.g., container 10 of FIG. 1) comprising a product (e.g., product 16 of FIG. 1) is new and has never been opened. The first data comprises a first time period. In step 412, the RFID tag reader generates (i.e., in response to the container being opened a first time) a first time stamp. In step 418, (i.e., in response to the container being opened a first time) the RFID tag reader transmits (to the RFID tag) in response to the container being opened the first time, a first message. The first message commands the RFID tag to enter a second state. The second state indicates that the container has been opened the first time. In step 420, the RFID tag reader transmits the first time stamp to the RFID tag in response to the container being opened the first time. The first time stamp is stored in the RFID tag and the container is closed. In step 422, the RFID tag reader (i.e., in response to the container being opened a second time) generates a second time stamp. The second time stamp indicates a later time than the first time stamp. In step 424, the RFID tag reader transmits the second time stamp to the RFID tag (i.e., in response to the container being opened the second time). In step 428, the RFID tag compares the second time stamp to a sum of the first time stamp and the first time period and determines results. The results of the comparing process are generated as follows:

1. The comparing process determines that the second time stamp is less than the sum of the first time stamp and the first time period.

2. The comparing process determines that the second time stamp is greater than the sum of the first time stamp and the first time period.

In step 432, the RFID tag reader receives (i.e., from the RFID tag) the results of comparing process generated in 428. In step 435, the RFID tag reader performs functions indicating the results.

A. If the results indicate that the second time stamp is less than the sum of the first time stamp and the first time period then the function may comprise enabling an indicator (s) (e.g., an audible indicator, a visual indicator, etc) specifying that the product is acceptable for use by a user. The indicator may be located on the RFID tag or RFID reader.

B. If the results indicate that the second time stamp is greater than the sum of the first time stamp and the first time period then the function may comprise enabling an indicator (s) (e.g., an audible indicator, a visual indicator, etc) specifying that the product is not acceptable for use by a user. In this case, any of the following additional optional steps may be performed:

1. The RFID tag reader transmits (i.e., to the RFID tag), a second message. The second message commands the RFID tag to enter a third state indicating that the product is expired and the container is closed.

2. The RFID tag reader (in response to closing the enclosure) is disabled (e.g., by removing a supply voltage from the RFID tag reader).

3. The RFID tag reader is enabled (in response to opening the enclosure).

4. The RFID tag reader transmits a signal to the RFID tag in response to the enabling in step 3.

5. The RFID tag reader receives (i.e., from the RFID tag in response to the signal) a message indicating the third state.

6. The RFID tag reader enables (i.e., in response to the third message) an indicator that indicates that said product has expired.

7. The RFID tag reader enables (i.e., in response to the third message) an actuator attached to the door on the enclosure and/or an actuator attached to the stopper on the container. The actuator on the door closes the door such that a user is unable to access the container comprising the expired product. The actuator on the cap locks the cap such that a user is unable remove the cap from the container thereby eliminating access to the product.

Figure 4:
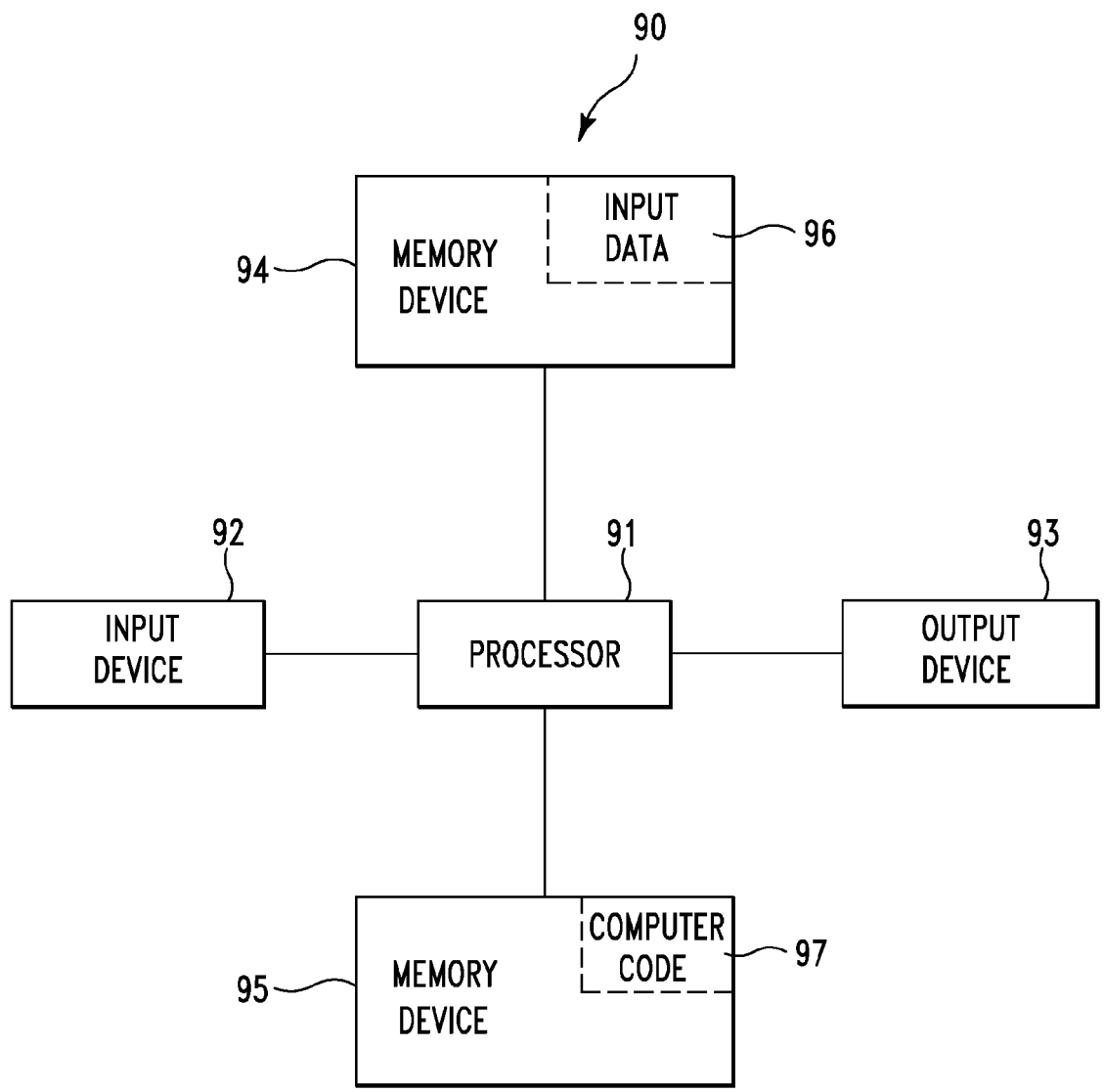
FIG. 4 illustrates a computer apparatus used for managing an expiration of products, in accordance with embodiments of the present invention.

FIG. 4 illustrates a computer apparatus 90 (e.g., RFID tag reader 7 of FIG. 1) used for managing an expiration of products, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for managing an expiration of products. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to manage an expiration of products. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for managing an expiration of products. In another embodiment, the invention provides a business method that performs the process steps of the invention on a subscription, advertising, and/or fee basis. That is, a service provider, such as a Solution Integrator, could offer to manage an expiration of products. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
    transmitting, by an RFID tag reader within an enclosure in response to first opening said enclosure, a plurality of continuous timing signals, wherein said enclosure comprises a container comprising a product, wherein said container is internal to said enclosure, wherein said container comprises an RFID tag mechanically attached to said container, and wherein said RFID tag comprises first data indicating a first state for said RFID tag, wherein said first state indicates that said container is new and has never been opened, and wherein said first data comprises a first time period;
    receiving, by said RFID tag reader from said RFID tag, said first data;
    generating, by said RFID tag reader in response to said container being opened a first time, a first time stamp;
    transmitting, by said RFID tag reader to said RFID tag in response to said container being opened said first time, a first message, wherein said first message commands said RFID tag to enter a second state, wherein said second state indicates that said container has been opened said first time;
    transmitting, by said RFID tag reader to said RFID tag in response to said container being opened said first time, said first time stamp, wherein said first time stamp is stored in said RFID tag, wherein said first container has been closed;
    generating, by said RFID tag reader in response to said container being opened a second time, a second time stamp, wherein said second time stamp indicates a later time than said first time stamp;
    transmitting, by said RFID tag reader to said RFID tag in response to said container being opened second time, said second time stamp, wherein said RFID tag performs a comparing process comprising comparing said second time stamp to a sum of said first time stamp and said first time period;
    receiving, by said RFID tag reader from said RFID tag, results of comparing process; and
    performing, by said RFID tag reader, a function indicating said results.

2. The method of claim 1, further comprising:
    before said transmitting said plurality of continuous timing signals, first enabling said RFID tag reader in response to said first opening, wherein said first enabling comprises receiving by said RFID tag reader a first voltage from a first voltage source.

3. The method of claim 2, said first voltage is received from said first voltage source via a switch enabled during said first opening.

4. The method of claim 2, wherein said results of said comparing process indicate that said second time stamp is less than said sum, and wherein said performing said function comprises:
    enabling, by said RFID tag reader, an indicator that indicates that said product is acceptable for use by a user.

5. The method of claim 4, wherein said indicator is selected from the group consisting of a visual indicator and an audible indicator.

6. The method of claim 4, wherein said indicator is mechanically attached to said RFID tag reader.

7. The method of claim 4, wherein said indicator is mechanically attached to said RFID tag.

8. The method of claim 2, wherein said results of said comparing process indicate that said second time stamp is greater than said sum, wherein said performing said function comprises enabling an indicator that indicates that said product is not acceptable for use by a user, and wherein said method further comprises:
    transmitting, by said RFID tag reader to said RFID tag in response to said results, a second message, wherein said second message commands said RFID tag to enter a third state, wherein said third state indicates that said product is expired, and wherein said first container has been closed after said transmitting said second message.

9. The method of claim 8, further comprising:
    after said transmitting said second message, first disabling said RFID tag reader in response to first closing said enclosure, wherein said first disabling comprises removing said first voltage from said RFID tag reader;
    after said first disabling, second enabling said RFID tag reader in response to second opening said enclosure, wherein said second enabling comprises receiving by said RFID tag reader said first voltage from said first voltage source;
    transmitting, by said RFID tag reader to said RFID tag in response to said second enabling, a signal;
    receiving, by said RFID tag reader from said RFID tag in response to said signal, a third message indicating said third state;
    enabling, by said RFID tag reader in response to said third message, an indicator that indicates that said product has expired.

10. The method of claim 9, wherein said indicator is selected from the group consisting of a visual indicator and an audible indicator.

11. The method of claim 9, further comprising:
    enabling, by said RFID tag reader in response to said third message, an actuator attached to a door on said enclosure, wherein said actuator closes said door such that a user is unable to access said container comprising said product.

12. The method of claim 9, further comprising:
enabling, by said RFID tag reader in response to said third message, an actuator attached to a stopper on said container, wherein said actuator locks said stopper such that a user is unable remove said stopper from said container thereby eliminating access to said product.

13. A computer program product, comprising a computer storage medium comprising a computer readable program code embodied therein, said computer readable program code configured to perform the method of claim 1 upon being executed by a processor of said RFID tag reader.

14. A process for supporting computer infrastructure, said process comprising providing at least one support service for at least one of creating, integrating, hosting, maintaining, and deploying computer-readable code in a computing system, wherein the code in combination with the RFID tag reader is capable of performing the method of claim 1.

15. An RFID tag reader comprising a processor coupled to a computer-readable memory unit, said RFID tag reader located within an enclosure, said memory unit comprising instructions that when executed by the processor implements an expiration management method, said method comprising:
transmitting, by said RFID tag reader in response to first opening said enclosure, a plurality of continuous timing signals, wherein said enclosure comprises a container comprising a product, wherein said container is internal to said enclosure, wherein said container comprises an RFID tag mechanically attached to said container, and wherein said RFID tag comprises first data indicating a first state for said RFID tag, wherein said first state indicates that said container is new and has never been opened, and wherein said first data comprises a first time period;
receiving, by said RFID tag reader from said RFID tag, said first data;
generating, by said RFID tag reader in response to said container being opened a first time, a first time stamp;
transmitting, by said RFID tag reader to said RFID tag in response to said container being opened said first time, a first message, wherein said first message commands said RFID tag to enter a second state, wherein said second state indicates that said container has been opened said first time;
transmitting, by said RFID tag reader to said RFID tag in response to said container being opened said first time, said first time stamp, wherein said first time stamp is stored in said RFID tag, wherein said first container has been closed;
generating, by said RFID tag reader in response to said container being opened a second time, a second time stamp, wherein said second time stamp indicates a later time than said first time stamp;
transmitting, by said RFID tag reader to said RFID tag in response to said container being opened said second time, said second time stamp, wherein said RFID tag performs a comparing process comprising comparing said second time stamp to a sum of said first time stamp and said first time period;
receiving, by said RFID tag reader from said RFID tag, results of comparing process; and
performing, by said RFID tag reader, a function indicating said results.

16. The RFID tag reader of claim 15, wherein said method further comprises:
before said transmitting said plurality of continuous timing signals, first enabling said RFID tag reader in response to said first opening, wherein said first enabling comprises receiving by said RFID tag reader a first voltage from a first voltage source.

17. The RFID tag reader of claim 16, said first voltage is received from said first voltage source via a switch enabled during said first opening.

18. The RFID tag reader of claim 16, wherein said results of said comparing process indicate that said second time stamp is less than said sum, and wherein said performing said function comprises:
enabling, by said RFID tag reader, an indicator that indicates that said product is acceptable for use by a user.

19. The RFID tag reader of claim 18, wherein said indicator is selected from the group consisting of a visual indicator and an audible indicator.

20. The RFID tag reader of claim 16, wherein said results of said comparing process indicate that said second time stamp is greater than said sum, wherein said performing said function comprises enabling an indicator that indicates that said product is not acceptable for use by a user, and wherein said method further comprises:
transmitting, by said RFID tag reader to said RFID tag in response to said results, a second message, wherein said second message commands said RFID tag to enter a third state, wherein said third state indicates that said product is expired, and wherein said first container has been closed after said transmitting said second message.

* * * * *